United States Patent [19]

Wagner

[11] 4,213,722
[45] Jul. 22, 1980

[54] TRANSPORTABLE EXTERNAL THREAD CUTTING MACHINE

[75] Inventor: Rudolf Wagner, Stuttgart, Fed. Rep. of Germany

[73] Assignee: Rems-Werk Christian Föll und Söhne GmbH & Co., Waiblingen, Fed. Rep. of Germany

[21] Appl. No.: 972,781

[22] Filed: Dec. 26, 1978

[30] Foreign Application Priority Data

Dec. 27, 1977 [DE] Fed. Rep. of Germany ....... 2758284
Nov. 3, 1978 [DE] Fed. Rep. of Germany ....... 2847784

[51] Int. Cl.² ............................................. B23B 39/00
[52] U.S. Cl. ....................................................... 408/73
[58] Field of Search .......................................... 408/73

[56] References Cited

U.S. PATENT DOCUMENTS

| | | |
|---|---|---|
| 2,291,758 | 8/1942 | Reimschissel .......................... 408/73 |
| 2,996,736 | 8/1961 | Benninghoff .......................... 408/73 |
| 3,188,666 | 6/1965 | Brown, Sr. et al. .................... 408/73 |

*Primary Examiner*—Harrison L. Hinson
*Attorney, Agent, or Firm*—Becker & Becker, Inc.

[57] ABSTRACT

A transportable external thread cutting machine having cutting blades which are mounted in a cutting head and can be brought into engagement with a workpiece which is to be machined by means of a control device which comprises an interacting slide and scanner. The slide and scanner form one single integral piece. When the cutting head is turned, the slide engages a control surface.

14 Claims, 9 Drawing Figures

TRANSPORTABLE EXTERNAL THREAD CUTTING MACHINE

The present invention relates to a transportable external thread cutting machine having cutting blades which are mounted in a cutting head. By means of a control device, the cutting blades can be brought into engagement with the workpiece which is to be machined. The control device has a slide which works together with a scanner and which contacts the control surface during a turning movement of the cutting head.

With a known machine of this type, the scanner is formed by a torque arm (Dreharm), which is located on the outside of the machine and which, during the turning of the cutting head by an eccentric, displaces a carriage which is positively connected with a spindle. As a result, the spindle is displaced. The spindle is connected with a tool holder for the cutting blades by means of a cam, so that by displacing the spindle, the cutting blades are displaced relative to the workpiece.

This heretofore known machine can be used, for example, at a construction site to cut conical external threads from non-portable, long workpieces, such as reinforcing iron. The outer thread of this reinforcing iron for concrete is screwed into connectors which are anchored in foundations for the secure transfer of preliminary stresses in a concrete body. However, only very small conical angles of at most 1:16 according to Din (German industrial norm) No. 29 99 can be cut with this machine. With larger conical angles, greater forces act upon the machine, because when cutting these angles, a larger amount of material must be machined off from the workpiece. At these greater machining forces, however, the torque arm is stressed so strongly that it can even break. Moreover, with this machine the force transfer path from the torque arm to the cutting tools is so great that due to the individual parts, such as the eccentric, the carriage, and the cam, which are interposed between the torque arm and the cutting tools, an exact production of such a conical thread having a large pitch is not assured. At great machining forces, not only the torque arm but also the remaining machine parts are exposed to such great stresses that they wear out after a relatively short period of time. Moreover, with this heretofore known machine, in addition to the actual friction between the eccentric and the carriage, a brake is built in which restrains the eccentric if the braking action of the eccentric itself is no longer assured at a particular turning angle.

Therefore, in order to assure a secure anchoring in the foundation for non-portable, long workpieces, other connecting means, such as, for example, powder metallurgical welded joints, must be used. However, considerable costs are associated with these measures.

It is therefore an object of the present invention to provide an external thread cutting machine with which conical external threads having a high pitch can also be properly cut with efficiency and with extreme precision.

This object, and other objects and advantages of the present invention, will appear more clearly from the following specification in connection with the accompanying drawings, in which:

The external thread cutting machine of the present invention is characterized primarily in that the scanner and the slide are constructed as one piece.

The direct connection of the scanner and the slide guarantee that the movement, which the scanner experiences on impacting the control surface, is imparted directly to the slide and thereby by the shortest path to the cutting blades. In so doing, despite a structurally simple and therefore economical construction of the machine, the thread can be cut very precisely. Moreover, as a result of the one-piece construction, the scanner is effectively supported with the slide in the cutting head, so that the scanner cannot be damaged by the great impact and bending forces which act upon it during impact with the control surface. Finally, the one-piece construction also has the advantage that essentially only the slide and the scanner are exposed to great forces. However, due to the secure support of the scanner and the slide in the cutting head, these forces can be effectively absorbed.

Figure 1:
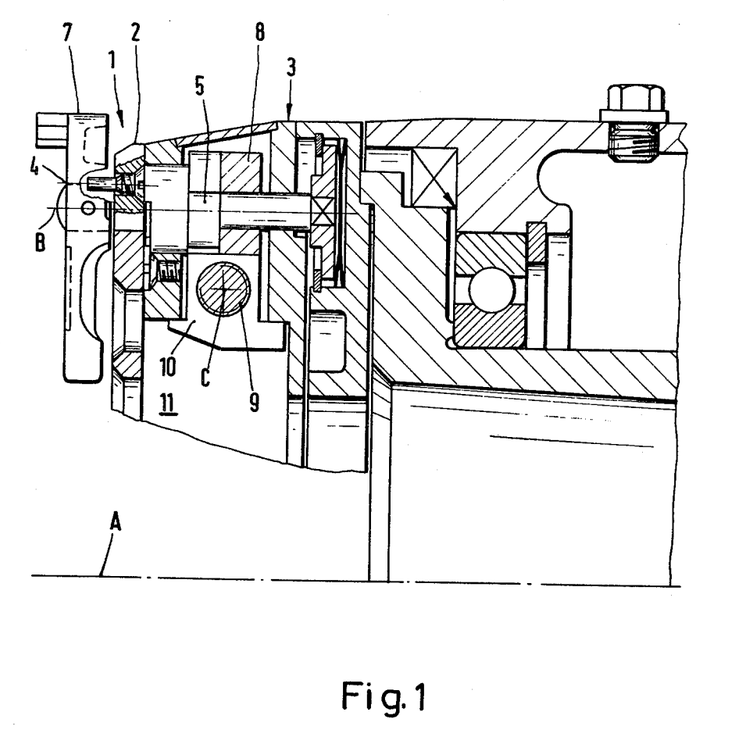
FIG. 1 is a vertical section through a portion of a known transportable external thread cutting machine in the region of its cutting head.

Referring now to the drawings in detail, to control the radial feed movement of cutting blades (not shown), which are mounted in a cutting head 1, relative to a workpiece which is to be machined (likewise not shown), the known external thread cutting machine illustrated in FIG. 1 has a torque arm 4 mounted on an annular cover 2 of a cutting head housing 3. The torque arm 4 is connected to an eccentric 5 which projects into an opening of a yoke-like carriage 8. This carriage 8 is non-displaceably mounted on a spindle 9 which is perpendicular to the axial direction A of the cutting head 1. A cam 10 is also mounted on the spindle 9. This cam 10 is essentially positively connected with a blade holder 11 for the cutting blades. The cam 10 is screwed onto a threaded section of the spindle 9 and is displaceably mounted relative to the spindle.

During the cutting process, the torque arm 4 is rotated over the cutting head 1. In this connection, the one free end face 7 of the torque arm 4 comes to rest against a control surface formed by the outer surface of a master cone (not shown). In so doing, the torque arm 4 is rotated about its turning axis B. Thus, the torque arm 4 of this machine serves as a scanner for the feed movement of the cutting blades. In the same manner, the eccentric 5 is also rotated, as a result of which the carriage 8 with the spindle 9, and thereby the cam 10 with the blade holders 11, are displaced in the axial direction C of spindle 9. At the same time, the cutting blades are displaced radially relative to the workpiece. The transfer of the control movement of the scanner to the spindle, and thereby to the blade holders, is therefore effected over a lengthy transfer path from the torque arm 4 over the eccentric 5 and the carriage 8 to the spindle 9, and from there over the cam 10 to the blade holder 11 and finally to the cutting blades themselves.

Figure 2:
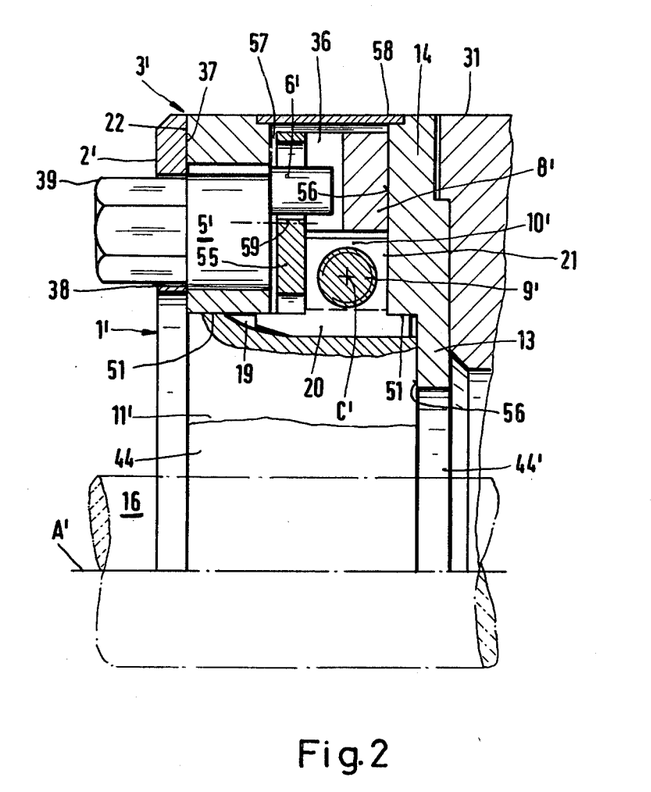
FIG. 2 is a section taken along the line II—II of the transportable external thread cutting machine of the invention shown in FIG. 3.
Figure 3:
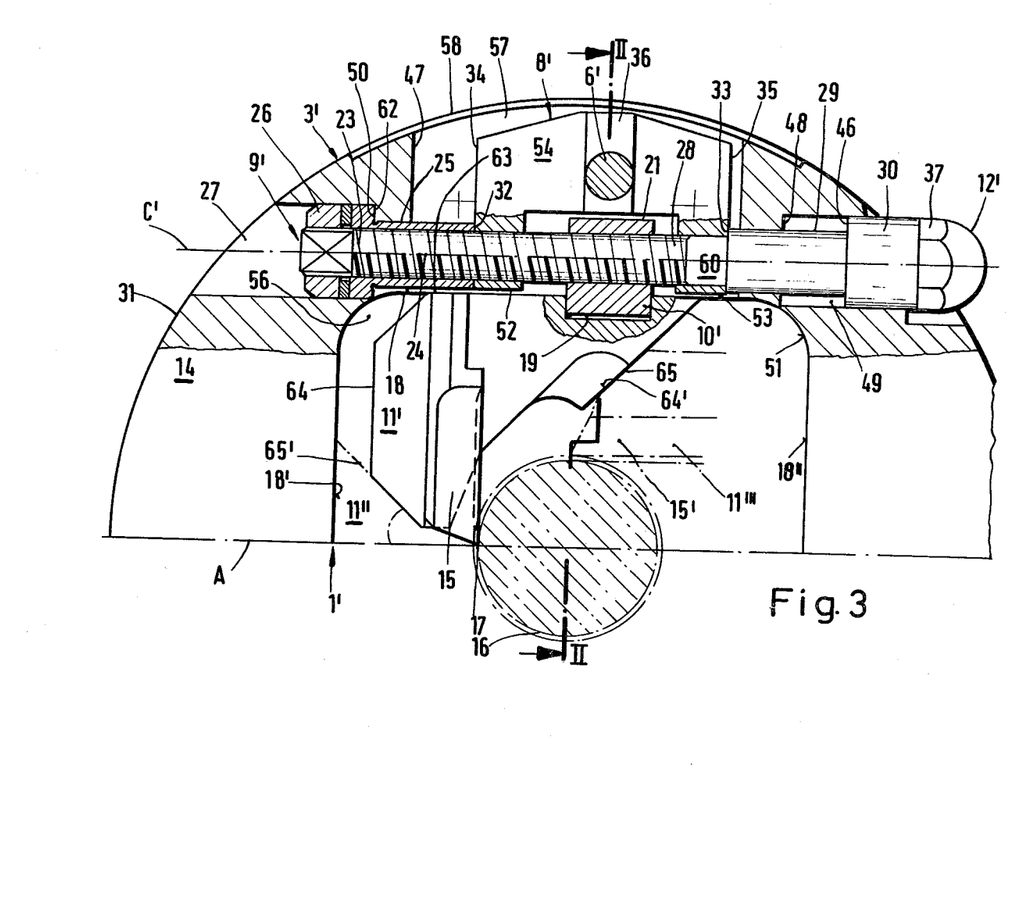
FIG. 3 is an axial section taken along the line III—III of the machine of FIG. 4.
Figure 4:
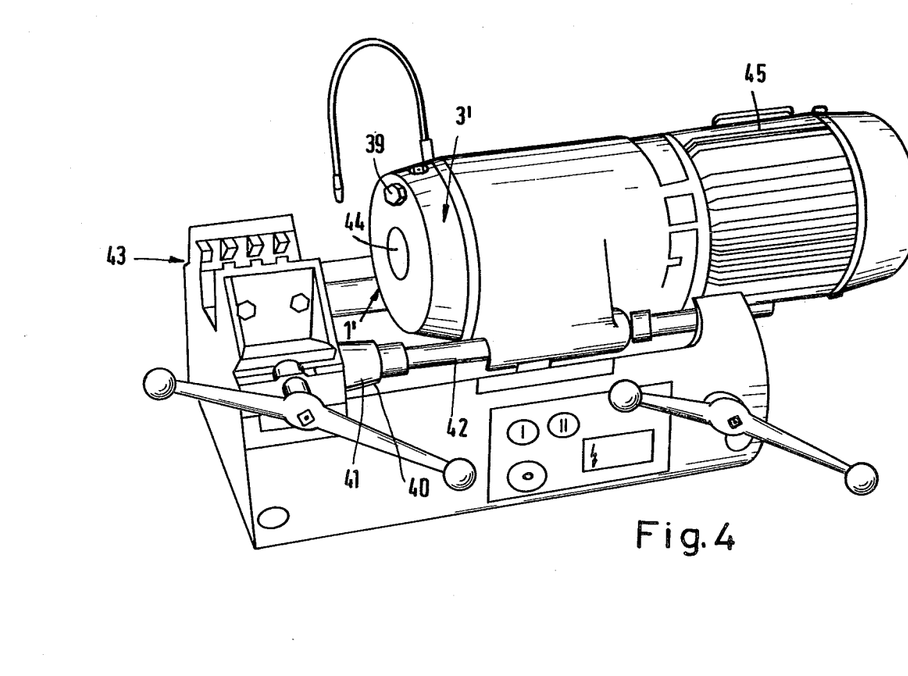
FIG. 4 is an isometric view of the machine shown in FIGS. 2 and 3.

In contrast, the control movement of the cutting blades of the external thread cutting machine of the present invention shown in FIGS. 2 to 4 can be transmitted directly from the scanner to the spindle, and thereby by the shortest path to the cutting blades.

FIGS. 2 and 3 show a cutting head 1' of the machine of the present invention shown in FIG. 4. The cutting head 1' has an annular housing 3', with an annular disc-like cover 2' screwed onto its end face 22. The housing 3' has a rearward bottom 13 which faces a motor 45 of the machine and is provided with a central opening 44' for a workpiece 16 which is to be machined. The housing wall 14 is thick-walled with a cylindrical outer surface 31 and a substantially quadratic inner surface 51. In the region above one quadratic side 18, the housing 3' has a rectangular bearing opening 57, the axis of which extends at right angles to the axis A' of the cutting head 1'. On its short sides, the bearing opening 57 leads through bores into further bearing openings 27 and 49 which are aligned with one another and in which is mounted a spindle 9' of the cutting head 1'. On pertaining bearing sections 26 and 30 of the spindle 9', the bearing openings 27 and 49 have conforming inside cross sections. In the region of the outer surface of the housing, the bearing opening 49 is widened so that a workpiece can be set upon one section of the pertaining bearing section which has a hexagonal profile.

An approximately U-shaped disc-like carriage 8' is arranged in the bearing opening 57, which can be closed off by a cover 58 which is positively mounted in the outer surface of the housing 3'. Provided in the arms 52 and 53 of this carriage 8' are bores which are aligned with one another and through which the spindle 9' projects (FIG. 3). Between the arms 52 and 53, an essentially T-shaped cam 10' is screwed onto a threaded section 24 which extends over half of the spindle 9'. For this purpose, the approximately square longitudinal leg 21 of the cam 10' has a threaded bore, and the cross bar 20 of the cam 10' extends perpendicular to the spindle axis C' (FIG. 2). The cross bar 20 is positively situated in a pertaining groove 19 of a blade holder 11' for a pertaining cutting blade 15 which is designed as a so-called hob blade, or tool for cutting threads (FIG. 3).

The cutting head 1' has four cutting blades 15 which in the circumferential direction are arranged one after another and are spaced from one another. The cutting blades 15, through the respective intervention of a blade holder 11' to 11''', rest on a pertaining quadratic surface 18 to 18'' of the inner surface of the housing 51. As shown in FIG. 3, the blade holders 11' to 11''' have, in side view, approximately the shape of a scalene right triangle. The entire surface of the longer triangle sides 63 of the blade holders engages the pertaining quadratic side 18 to 18'' of the inner surface 51. The shorter triangle side 64, 64' and the triangle tip of the blade holders are respectively chamfered. In the region of the chamfered triangle side 64, a laterally open insertion opening (not shown) is provided for the pertaining cutting blade 15 in the base side 65, 65'. The insertion opening extends essentially over the entire width and height of the blade holders 11' to 11''''. The insertion opening is closable by a wall section which is likewise not shown. As shown in FIG. 3 with dot-dash lines, adjacent further blade holders 11'' and 11'''' contact the chamfered shorter triangle side 64 and the base side 65 of the blade holder 11' with their base side 65' and triangle side 64'. Appropriately, a fourth, not shown, blade holder, which is diametrically opposite the blade holder 11', contacts these blade holders. In their operating position, the cutting edges 17 of the cutting blades 15 and 15' of the blade holders 11' to 11''' are tangential to the outer surface (to be machined) of the workpiece 16 which is clamped into a clamping device 43 of the machine (FIG. 4).

By means of the above described arrangement of the blade holders, all of the other blade holders can be displaced synchronously in the same manner by displacing one of the blade holders in a direction perpendicular to the axis A' of the cutting head.

As shown in FIG. 2, the blade holders 11' to 11''' are constructed the same and are so wide that they fill the axial space of the housing 3' between the bottom 13 and the contact surface 37 of the cover 2'.

Referring to FIGS. 2 and 3, the cross bar 54 of the carriage 8' is approximately perpendicular to the axis C' of the cutting head 1' and has a vertical groove 36 which extends over the entire height of the cross bar 54 and is parallel to the arms 52 and 53. An eccentric 5' with a pin 6 positively engages the groove 36. In order to damp the impact of the spindle 9' on the control surface 40 of a so-called master cone 41 (FIG. 4), a brake disc 55 is provided between the eccentric 5' and the carriage 8'. The brake disc 55 is pressed against the carriage 8' by means of pins or the like located in the housing. A feeding movement is transferred from the so-called master cone 41 by means of the spindle 9' to the blade holders 11' to 11'''. This feed movement is decisive for the thread which is to be cut.

The carriage 8' and the cam 10' have the same width; their wide sides form a common contact surface on a bottom side, inner surface 56 of the housing 3' and the brake plate 55. The brake plate 55 has a greater axial extension than does the carriage 8', and, to allow the pin 6 to pass through, has an elongated opening 59 which likewise extends perpendicular to the axis A' of the cutting head 1', and extends nearly over the entire height of the groove 36. The opening 59 is dimensioned in such a way that it does not hinder the somewhat circular eccentric movement.

A tube-like stop portion 25 is screwed over the free end 23 of the threaded section 24 of the spindle 9'. The widened end collar 26 of the stop portion 25 lies in the pertaining bearing opening 27 of the housing 3', so that the end collar 26 forms a bearing section of the spindle 9'. The other end 28 of the spindle 9' widens outwardly in a step-like manner so that an inner and outer end section 29 and 30 are formed. The outer end section 30 has a spherically rounded off dome 12' which in the operating position projects outwardly over the housing 3'. The outer section 30 forms the other bearing section with which the spindle 9' is supported in the bearing opening 49. The inner section 29 has the same outer diameter as the stop portion 25 in the region beyond its end collar 26. The inner end section 29 has a section 60 which is connected to the threaded section 24 and is smaller than the remaining region of the end section 29. The section 60 lies in the pertaining bore of the arm 53 of the carriage 8', so that the vertical small side 35 of the carriage 8' rests against the shoulder surface 33 of the inner end section 29. The other small side 34 of the carriage 8' rests against the inner end face 32 of the stop piece 25, as a result of which the carriage 8' is effectively secured against axial displacement relative to the spindle 9'. With the carriage 8', the spindle 9', along with the cam 10' and thereby all of the blade holders 11' to 11''', can at the same time be displaced out of its end position, which is assumed after the conclusion of the cutting process and in which the cutting blades 15 and 15' are lifted off the workpiece 16, and into its starting position, in which the dome 12' projects over the housing 3'. This return movement is carried out with the aid of the eccentric 5'.

During the displacement of the spindle 9' and the cam 10' with the pertaining tool holder 11', pushing forces are exerted upon the abutting slanted surfaces of the adjacent blade holders 11' to 11''', so that the blade holders are shifted against one another in conformity with the displacement path of the cam, in which connection the pertaining blade is fed radial to the workpiece.

In order to return the spindle 9' from its end position into its starting position, the eccentric 5' has a connecting piece 39 for a tool, especially a hexagonal spanner (FIG. 2). This connecting piece 39 projects outwardly through an opening 38 provided in the housing wall 14 and the cover 2'. After the conclusion of the cutting process, the shoulder surface 46 of the outer end section 30 of the spindle, which shoulder surface 46 faces the carriage 8', rests against the pertaining bottom 48 of the bearing opening 49, and the small side 34 of the carriage 8' rests against the opposite wall 47 of the bearing opening 57. By turning the connecting piece 39, the carriage 8' is shifted out of this end position into its starting position, in which that end face 62 of the end collar 26 of the stop portion 25 which faces the dome 12' of the spindle 9' rests against the pertaining bottom 50 of the housing opening 27. By turning the spindle 9', in which connection the cam 10' with the pertaining tool holder 11' is shifted relative to the spindle, the cutting blades 15, 15' are brought to the workpiece which is to be machined until the cutting blades 15, 15' contact the free end of the workpiece. With the dome 12', by turning the cutting head 1', the spindle 9' abuts the control surface 40 which is formed by the surface of the master cone 41 (FIG. 4). To increase its strength, the dome 12' is hardened, so that upon impact of the master dome, it will not be damaged. The master cone 41 is mounted on a horizontally extending rod 42 of the machine. Essentially the entire length of the spindle 9' lies within the cutting head, and a large surface thereof is supported by the end collar 26 of the stop portion 25 and by the outer end section 30. In this manner, a very secure guiding of the spindle 9' is assured, so that while cutting conical external threads having a large pitch, the spindle cannot be damaged by the great forces which occur, and in addition, an effective transfer of force to the cutting blades 15, 15' is assured.

As already described above, in order to cut the thread, the workpiece is clamped into the clamping device 43 which is arranged on the front end of the machine. In this connection, the free end of the workpiece projects into a central opening 44 of the cover 2'. Even before the cutting head 1' is started by the motor 45 which is located at the back of the machine, the cutting blades 15, 15' are brought to the free end face of the end of the workpiece 16. For this purpose, the spindle 9' is turned by the hexagonal profile, in which connection the cam 10' with the blade holders 11'-11''' are displaced and feed the blades 15, 15' radial to the workpiece. The motor 45 is then started, so that the cutting head is turned. With every revolution of the cutting head 1', the dome 12' of spindle 9', which dome serves as a scanner, abuts the control surface 40 of the master cone 41, from which it scans the feed movement of the blades. In conformity with this control surface, the spindle 9', with the carriage and the cam 10', is displaced. After finishing the threading, the cutting blades 15, 15' automatically disengage the workpiece 16. In this end position, that small side 34 of the carriage 8' which faces away from the dome 12' rests against the wall 47 of the bearing opening 57, and the shoulder 46 of the outer end section 30 of the spindle 9' rests against the bottom 48 of the bearing opening 49 of the housing wall 14. After that, the machined workpiece is released from the clamping device 43 and is removed from the machine. The cutting blades are then moved into the starting position of the spindle 9' for a new working operation by means of the connecting piece 39 with the aid of a tool. By turning the spindle 9', the blades are brought into contact with a workpiece which is newly clamped into the clamping device 43. The cutting blades are then ready for a new cutting process, which is initiated by again starting the motor.

The thread cutting machine of FIGS. 5 to 9 is likewise arranged on a support 67 and comprises a clamping device 43a and the actual cutting head 1a, at one end of which is connected a drive motor 45a.

Figure 5:
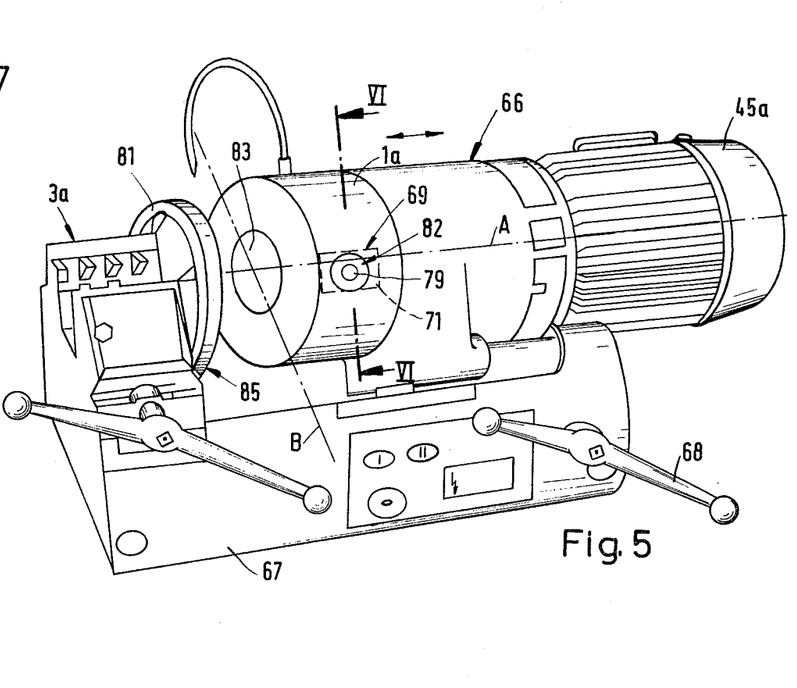
FIG. 5 shows an isometric view of another thread cutting machine according to the present invention which has a guide ring and a guide plate on the cutting head.

The clamping device 43a serves to center and hold a workpiece, and is positively connected to the support 67. The cutting head 1a, with the motor 45a, is longitudinally displaceably guided on the support 67. This longitudinal movement is effected by a feed handle 68 or by a similarly operating device.

Figures 6, 9:
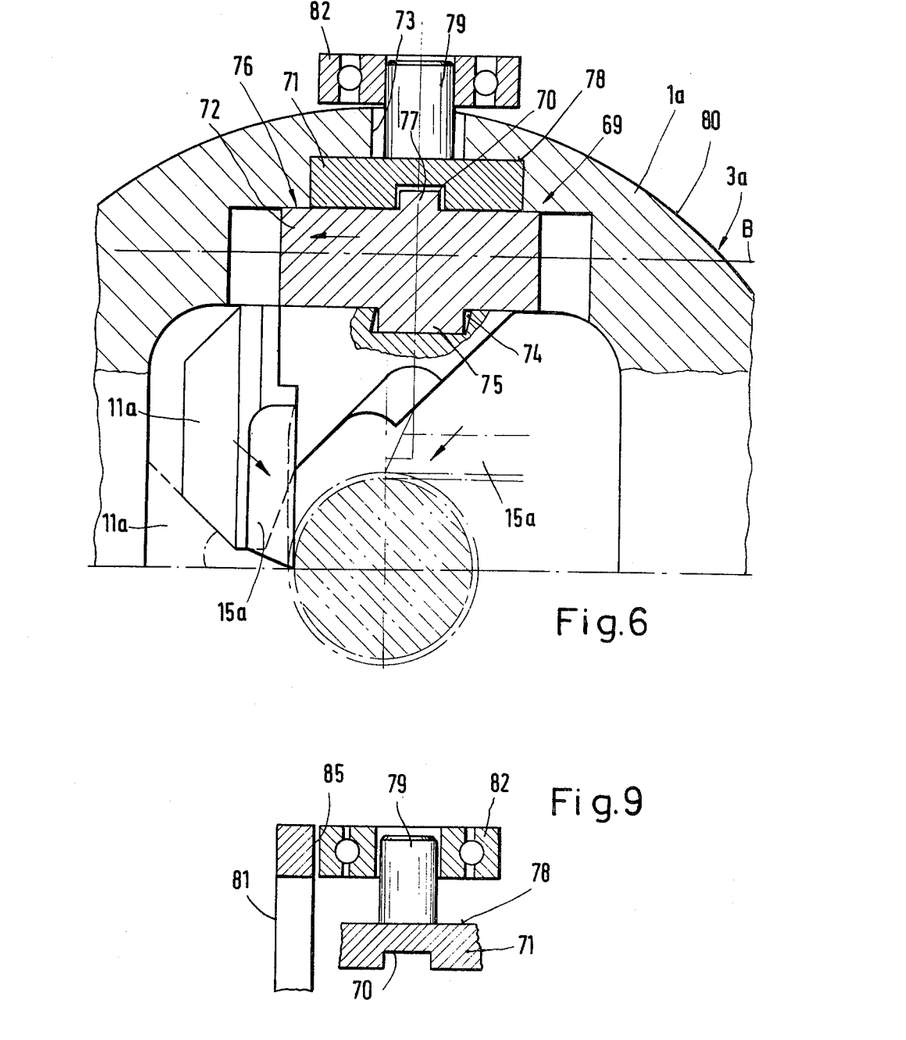
FIG. 6 is a section taken along the line VI—VI of the machine of FIG. 5.
FIG. 9 is a side view of FIG. 5 taken in section and showing a control pin of the plate-like part resting on the slide surface of the guide ring.

Blade holders 11a with cutting blades 15a are held in the cutting head 1a. The cutting blades 15a can be delivered by the control device 69 to the workpiece to cut the thread. The control device 69 is constructed in the form of a crank or coulisse, and comprises a guide track 70 with a sliding block 72. By displacing the guide track 70, which is provided in a plate 71, in the longitudinal direction of the cutting head 1a along an axis A, the sliding block 72 effects a direct control of the blade holder 11a and thereby the cutting blades 15a for the thread cutting.

The guide plate 71 is displaceably held in a T-shaped groove 73 of the cutting head 1a. This groove 73 extends in the longitudinal direction and is open toward the outside. The sliding block 72 is arranged between the guide plate 71 and the blade holder 11a. The sliding block 72 is held in the blade holder 11a by means of a cam 75 which projects into a groove 74 of the holder 11a. On that side 76 which faces away from the cam 75 and faces the guide track 70, the sliding block 72 has a guide pin 77 which projects into the track 70, in which it slides in conformity with the movement of the guide plate 71.

To displace the guide plate 71, a control pin 79 is held on the upper side 78 of the plate. The control pin 79 projects beyond the outer surface 80 of the cutting head housing 3a, and engages a guide ring 81 (FIG. 9). The guide ring 81 is positively connected to the support 67, or to the clamping device 43a or another device of the machine 56. For a reduced frictional adjustment of the guide plate 71 in the longitudinal direction, wheel or gear means, shown in FIGS. 6 and 9 as a ball bearing 82, is mounted on the control pin 79.

Figure 7:
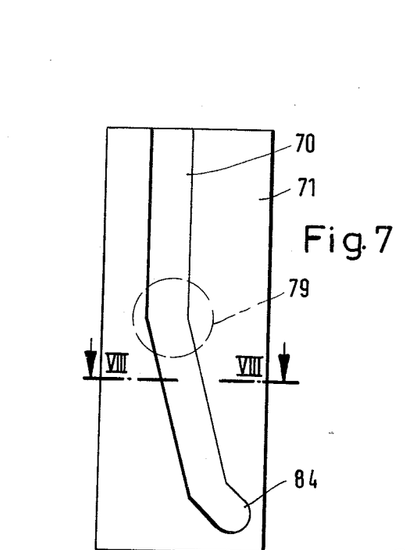
FIG. 7 is a top view of the plate showing the guide track.
Figure 8:
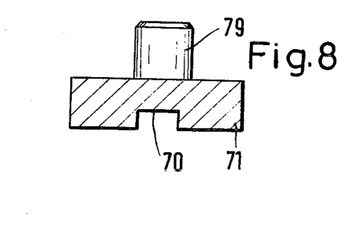
FIG. 8 is a section taken along the line VIII—VIII of FIG. 7.

The guide 70 in the plate 71 is constructed as an inner guide. It would also be possible to have an outer guide with a correspondingly constructed sliding block. The path of the guide 70 may be selected in conformity with the type of thread. The guide plate 71 can be pulled out of the T-shaped groove 73 of the cutting head 1a in a simple manner, and can be replaced by another guide plate for cutting another thread.

To cut the thread, the workpiece is clamped into the clamping device of the machine 66. In this connection, the free end of the workpiece projects into a central opening 83 of the cutting head 1a. Before cutting head 1a is started by the motor 45a arranged at the back of the machine, the cutting blades 15a are guided to the free end faces of the end of the workpiece. The end 84 of the guide track 70 (FIG. 7) is opposite the guide pin 77, and the control pin 79 contacts the sliding surfaces 85 at the end faces of the guide ring 81. By a steady displacement of the cutting head 1a in the direction of the guide ring 81, the guide plate 71 with the guide track 70 is displaced in the longitudinal direction within the cutting head. With this movement, the sliding block 72 is displaced in the transverse direction of the cutting head along an axis B in conformity with the course of the guide track 70. In so doing, the cutting blades 15a are continuously adjusted relative to the workpiece in such a way that they are radially returned. During this displacement, pushing forces are exerted upon abutting inclined surfaces of adjacent blade holders 11a, so that the blade holders are displaced against one another in conformity with the displacement path of the sliding block 72. In this connection, the pertaining blade can be moved radially outwardly in relation to the workpiece.

Pursuant to the above mentioned alternate embodiment, as is the case with the first embodiment which has the spindle, it is possible to act directly upon the sliding block which is connected with the blade holders. This makes possible a continuous feed movement of these blades to the workpiece, and improves the quality of the thread. Moreover, also with this embodiment no sudden burst-like stresses per revolution of the cutting head occur. Rather, by the constant contact of the control pin on the guiding ring, a stress on the elements of the control device can be achieved which is uniform during each revolution of the cutting head. Particularly advantageous is the fact that the plate-shaped portion 71 can at any time be simply and quickly replaced by another part with corresponding course of the guide track according to the thread to be cut, for example with a different pitch.

The present invention is, of course, in no way restricted to the specific disclosure of the drawings, but also encompasses any modifications within the scope of the appended claims.

What I claim is:

1. A transportable external thread cutting machine for threading a workpiece, which machine includes:
    a cutting head;
    cutting blades displaceably mounted in said cutting head;
    a control device operatively connected with said cutting head and said cutting blades and comprising a one-piece unit which forms a slide and a scanner;
    control means, including a control surface selected in conformity with a desired thread, operatively associated with said one-piece unit for moving same relative to said workpiece in response to contact between said scanner and said control means.

2. A machine according to claim 1, in which said slide is a spindle and said scanner is a rounded off dome of said spindle, and in which said machine comprises an eccentric for displacing said spindle; a carriage which is mounted on said spindle and is provided with a groove engageable by said eccentric; and a connecting piece forming a part of said spindle and projecting beyond said cutting head and operable by a tool for turning said eccentric.

3. A machine according to claim 2 which includes abutment means for confining said carriage therebetween in the axial direction of said spindle.

4. A machine according to claim 3, in which said abutment means respectively comprise a sleeve which surrounds said spindle and a widened end section of said spindle, said machine also comprising a cutting head housing provided with bearing openings for supporting said abutment means.

5. A machine according to claim 3, in which said spindle is displaceable between a starting position and an end position, and in which at least one of said carriage, said sleeve and said end section comprises contact surfaces for engagement with pertaining surfaces of said housing in the end position of said spindle.

6. A machine according to claim 4, which includes a brake plate which is connected with said carriage and is non-rotatably mounted relative to said housing.

7. A machine according to claim 6, which includes a cam which is non-rotatably mounted in said housing around said spindle.

8. A machine according to claim 1, in which said slide is a plate provided with a guide track, said machine also comprising a blade holder operatively connected to said control device, and a slide block located in said blade holder and guided by said guide track.

9. A machine according to claim 8, in which said guide track is an inner track which is curved relative to the longitudinal central axis of said slide plate.

10. A machine according to claim 9, in which said cutting head is provided with a T-shaped guiding groove, said slide plate being displaceable in said guiding groove in the longitudinal direction of said cutting head relative to said slide block.

11. A machine according to claim 9, in which said blade holder is provided with an outwardly facing groove, said machine also including a holding cam on that side of said slide block which faces said blade holder, said holding cam projecting into said groove of said blade holder; and a guide pin located on that side of said slide plate which faces away from said blade holder, said guide pin engaging said inner track of said slide plate.

12. A machine according to claim 11, in which said guide pin is adjustable in the transverse direction of said slide plate as a function of the curved track of said inner track and the longitudinal movement of said slide plate.

13. A machine according to claim 8, in which said scanner comprises a control pin provided on that side of said slide plate which faces away from said inner track, and in which said control means comprises a guide ring located opposite said cutting head and provided with a slide surface for engagement by said control pin.

14. A machine according to claim 13, in which said control pin comprises a wheel having a circumferential surface for engagement of said slide surface of said guide ring.

* * * * *